(12) United States Patent
Wu et al.

(10) Patent No.: US 8,493,725 B2
(45) Date of Patent: Jul. 23, 2013

(54) SLIDING MODULE FOR ELECTRONIC DEVICE

(75) Inventors: Ke-Long Wu, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 193 days.

(21) Appl. No.: 13/216,736

(22) Filed: Aug. 24, 2011

(65) Prior Publication Data

US 2012/0236476 A1    Sep. 20, 2012

(30) Foreign Application Priority Data

Mar. 14, 2011 (CN) .......................... 2011 1 0060381

(51) Int. Cl.
 *G06F 1/16* (2006.01)
(52) U.S. Cl.
 USPC .................. 361/679.27; 248/611; 312/334.46
(58) Field of Classification Search
 USPC ................ 403/81; 248/121, 286.1, 157, 688, 248/278.1, 611; 361/679.59, 679.34, 679.08, 361/679.54, 679.01, 679.28, 679.17, 679.55, 361/679.41, 679.27, 679.23, 679.58, 679.06, 361/679.15, 679.22; 345/158, 420, 655, 589, 345/156, 168, 169, 1.1, 173, 174; 439/66, 439/354, 67; 312/334.1, 323, 293.1, 237, 312/319.2, 223.1, 223.2, 334.46
 See application file for complete search history.

(56) References Cited

U.S. PATENT DOCUMENTS

| | | | | |
|---|---|---|---|---|
| 2007/0030634 | A1* | 2/2007 | Maskatia ....................... | 361/683 |
| 2012/0293927 | A1* | 11/2012 | Duan et al. ............... | 361/679.01 |
| 2012/0308296 | A1* | 12/2012 | Li et al. ........................... | 403/81 |

* cited by examiner

*Primary Examiner* — Hung Duong
(74) *Attorney, Agent, or Firm* — Altis Law Group, Inc.

(57) ABSTRACT

A sliding module includes a first section, a second section, a hinge module, a sliding member and a pivot plate. The first section includes a connecting member. The hinge module is positioned on the second section. The sliding member is slidably engaged with the second section, and is rotatably connected to the connecting member of the first section. Two ends of the pivot plate are respectively connected to the first section and the hinge module. When the sliding member slides relative to the second section, the pivot plate brings the first section to move and rotate relative to the second section in a tilted orientation.

15 Claims, 6 Drawing Sheets

SLIDING MODULE FOR ELECTRONIC DEVICE

CROSS-REFERENCE TO RELATED APPLICATIONS

The present application is related to U.S. patent application Ser. No. 13/164,301, filed on Jun. 20, 2011), entitled "SLIDING MODULE FOR ELECTRONIC DEVICE", by Duan et al. This application has been filed and has the same assignee as the present application. The above-identified applications are incorporated herein by reference.

BACKGROUND

1. Technical Field

The present disclosure generally relates to electronic devices, and particularly to a sliding module for an electronic device.

2. Description of Related Art

Portable electronic devices such as mobile phones, laptops, and personal digital assistants (PDAs) are widely used. As such, the sales and use of slide-type portable electronic devices have been on the increase. A slide-type portable electronic device has two housings, which can open and close relative to each other with the use of a slide mechanism.

However, the slide-type devices typically only allow the two housings to slide parallel to each other. Therefore, when the slide-type is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
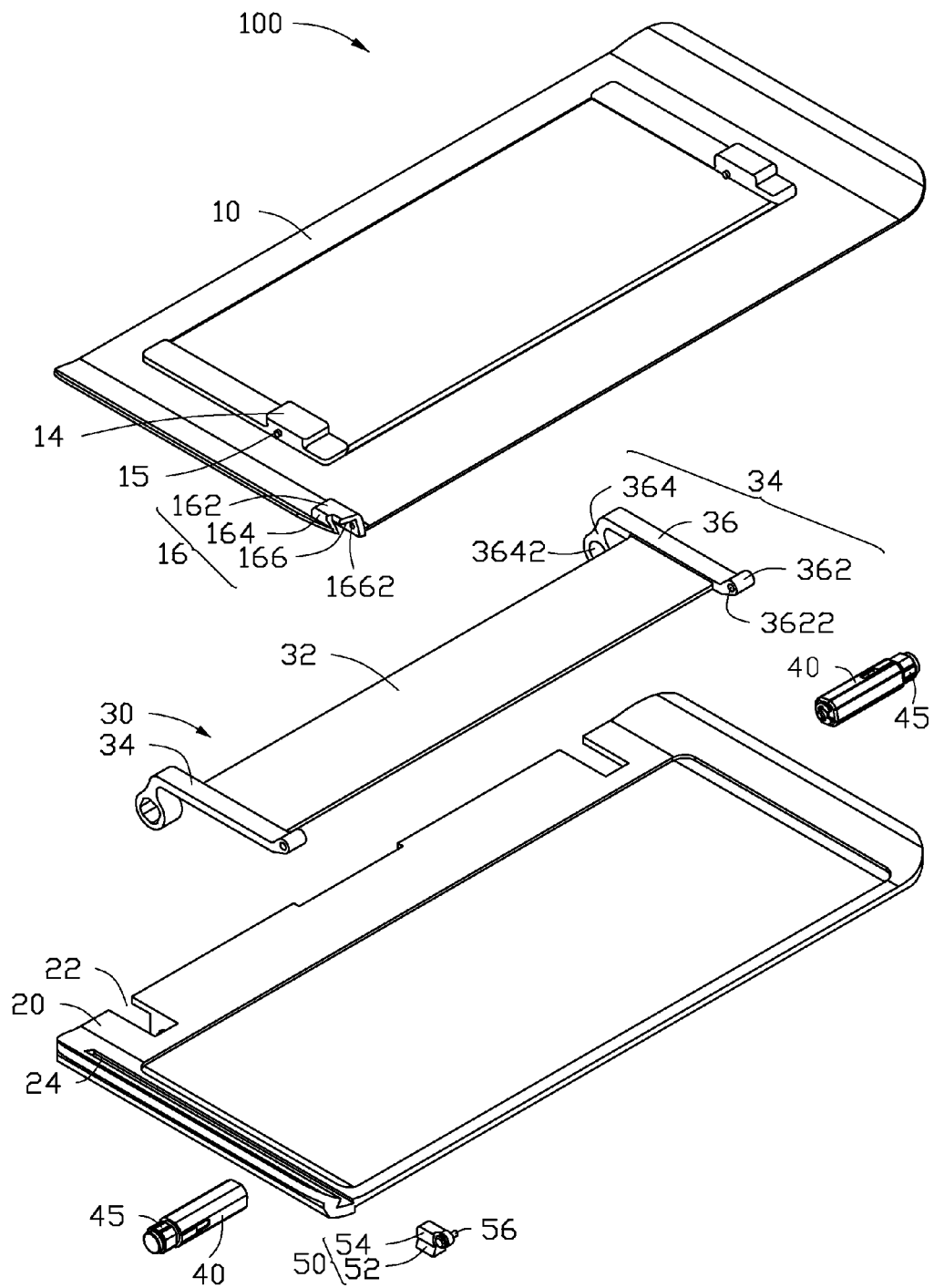
FIG. 1 is an exploded, isometric view of an electronic device according to an exemplary embodiment.
Figure 2:
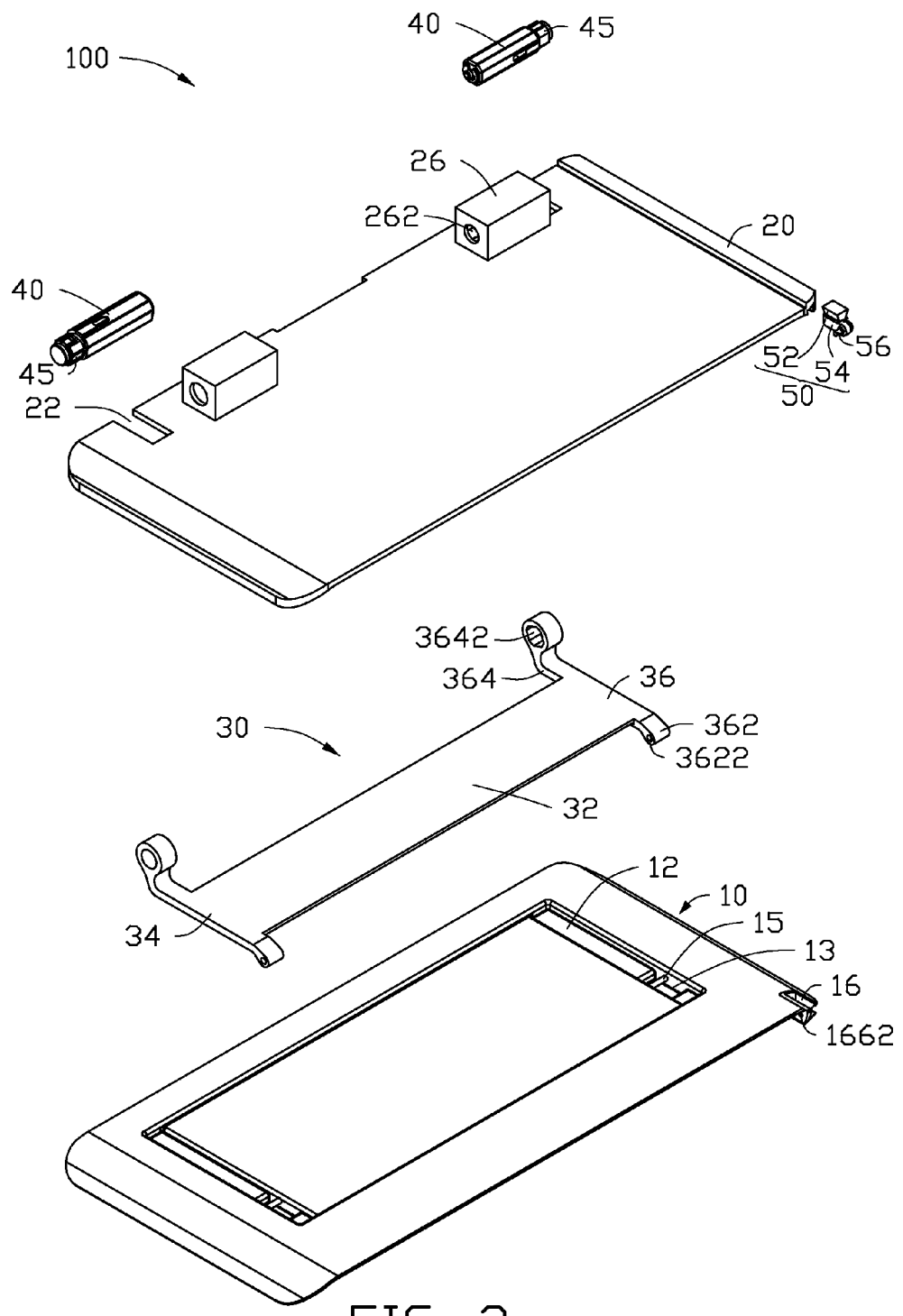
FIG. 2 is similar to FIG. 1, but shown from another angle.

FIG. 1 and FIG. 2 show an exemplary embodiment of a sliding module 100 applied in an electronic device, such as a mobile phone, or a personal digital assistant. The sliding module 100 can be in a closed orientation and a tilted open orientation. The sliding module 100 includes a first section 10, a second section 20, a pivot plate 30, a pair of hinge modules 40, and a sliding member 50. In the closed orientation, the first section 10 and the second section 20 overlap each other. In the tilted open orientation, the first section 10 is tilted relative to the second section 20 for better viewing.

The first section 10 defines two retaining grooves 12 at opposite sides thereof. A bottom portion of each retaining groove 12 is protruded outward to form a cavity 13 and a protruding wall 14 surrounding the cavity 13. A post 15 is fixed in the cavity 13, and two ends thereof extend out from the protruding wall 14. A connecting member 16 is disposed at a corner of the first section 10. The connecting member 16 includes a top wall 162, a first sidewall 164 and a second sidewall 166. The first sidewall 164 and the second sidewall 166 are connected at opposite sides of the top wall 162, thereby surrounding a receiving space for receiving the sliding member 50. The second sidewall 166 defines a pivot hole 1662 for rotatably connecting to the sliding member 50. In this exemplary embodiment, the connecting member 16 is welded to the first section 10. Understandably, the connecting member 16 may be integrally formed with the first section 10.

The second section 20 defines two notches 22 at one side thereof, and defines a wedge groove 24 at one end of a surface thereof for slidably receiving the sliding member 50. A hinge barrel 26 is formed on an opposite surface of the second section 20 adjacent to each notch 22. A receiving hole 262 is defined at one end of each hinge barrel 26 for receiving a corresponding hinge module 40.

The pivot plate 30 includes a main body 32 and two support arms 34 formed at two sides of the main body 32. Each support arm 34 includes a connecting arm 36, a first hinged portion 362 and a second hinged portion 364 connected to two ends of the connecting arm 36. The first hinged portion 362 defines a first through hole 3622 for receiving the post 15 in the first section 10. The second hinged portion 364 defines a second through hole 3642 for fixing one portion of the hinge module 40.

Figure 3:
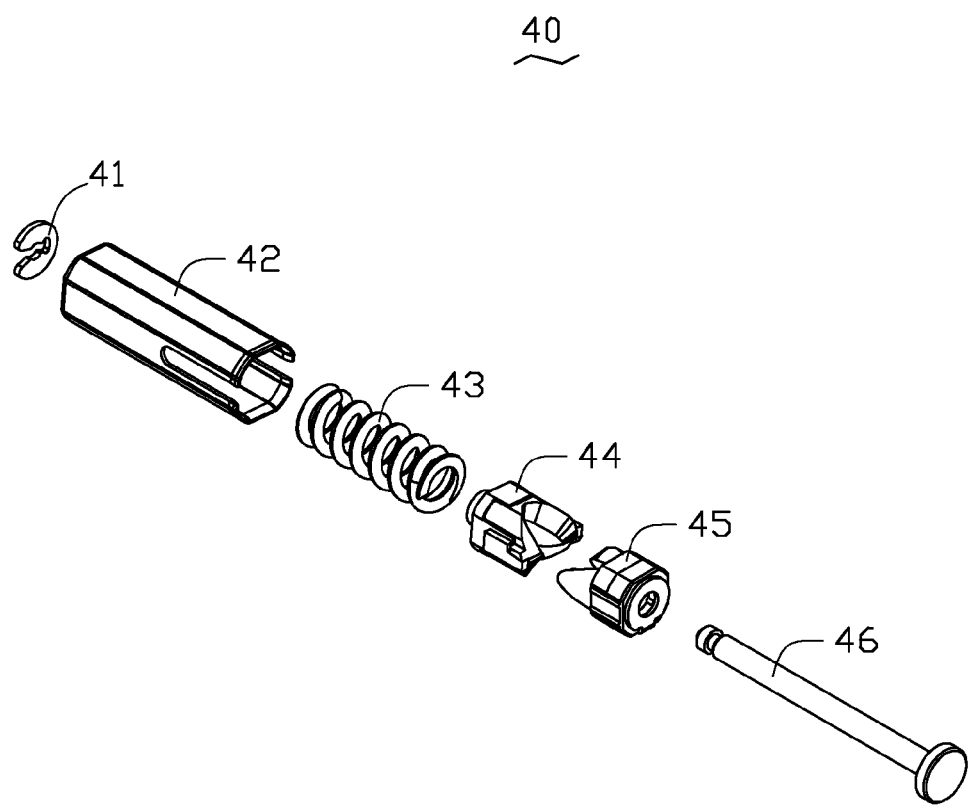
FIG. 3 is an exploded, isometric view of a hinge assembly used in the electronic device shown in FIG. 1.

Referring to FIG. 3, the hinge module 40 includes a washer 41, a sleeve 42, a resilient member 43, a follower 44, a cam 45, and a shaft 46. The cam 45, the follower 44, and the resilient member 43 are fitted over the shaft 46, and are received in the sleeve 42. The washer 41 is latched to one end of the shaft 46 with the above elements to assemble a unit. The follower 44 is non-rotatably engaged in the sleeve 42. The sleeve 42 can be inserted into the hinge barrel 26 from the receiving hole 262 and cannot rotate relative to the hinge barrel 26. The cam 45 can be inserted into the second through hole 3642 of the second hinge portion 364, and is non-rotatably engaged with the second hinge portion 364 of the pivot plate 30. The follower 44 includes peaks and valleys, and the cam 45 can slide over the peaks of the follower 44 to allow the cam 45 to rotate relative to the follower 45.

The sliding member 50 includes a sliding block 52 and an extending end 54 integrally formed together. The sliding block 52 is substantially wedged-shaped, and is slidably received in the wedge groove 24 of the second section 20. The extending end 54 can be received in the connecting member 16. A pin 56 is formed on the extending end 54 for being received in the pivot hole 1662 of the connecting member 16 to allow the sliding member 50 to be rotatably connected to the first section 10.

Figure 4:
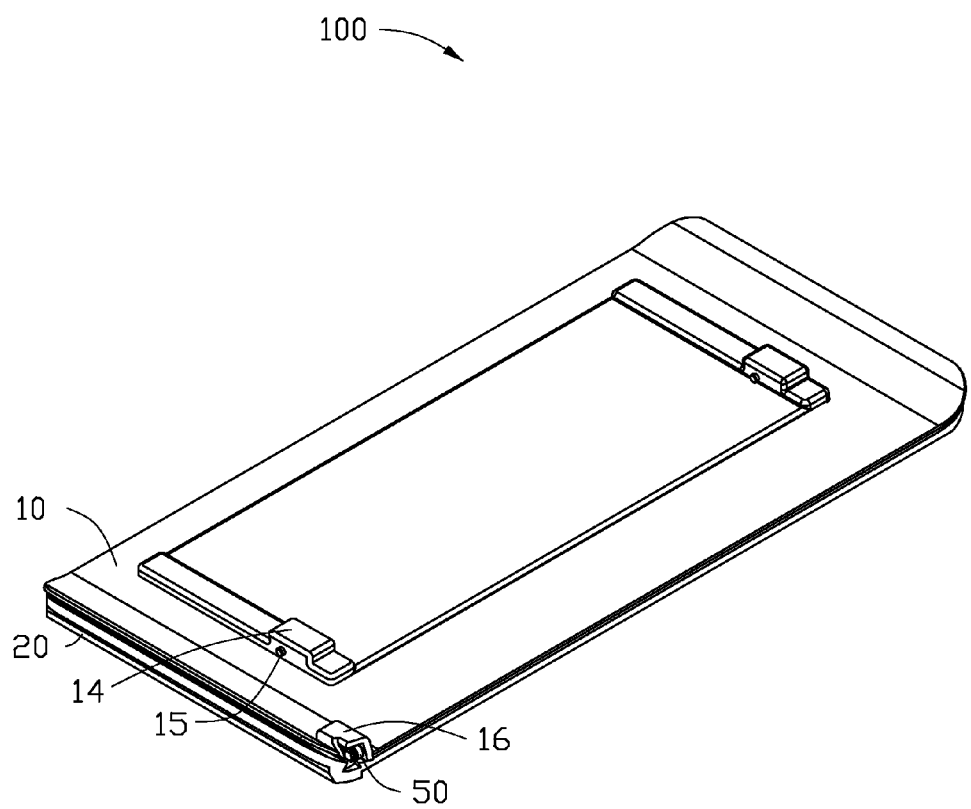
FIG. 4 is an isometric view of the electronic device of FIG. 1 in a closed orientation.

In assembly, referring to FIG. 4, each assembled hinge module 40 is received in a corresponding hinge barrel 26 of the first section 10 from the receiving hole 262. The sleeve 42 is non-rotatably engaged with the hinge barrel 26. The first hinged portion 362 of the pivot plate 30 is rotatably connected to the post 15 of the first section 10. The second through hole 3642 of the second hinged portion 364 receives the cam 45 of the hinge module 40 to non-rotatably connect the pivot plate 30 to the hinge module 40. Then, the sliding block 52 of the sliding member 50 is received in the wedge groove 24 of the second section 20. The extending end 54 of the sliding member 50 is received in the receiving space of the connecting member 16. The pin 56 is received in the pivot hole 1662 to allow the sliding member 50 to rotatably connect the connecting member 16. Accordingly, the sliding module 100 is assembled.

When the sliding module 100 is in a closed orientation, the first section 10 is on the second section 20. The connecting arm 36 of the pivot plate 30 is received in the retaining groove 12 of the first section 10. The sliding member 50 is positioned at one end of the groove 24, and the extending end 54 is received in the connecting member 16.

Figure 5:
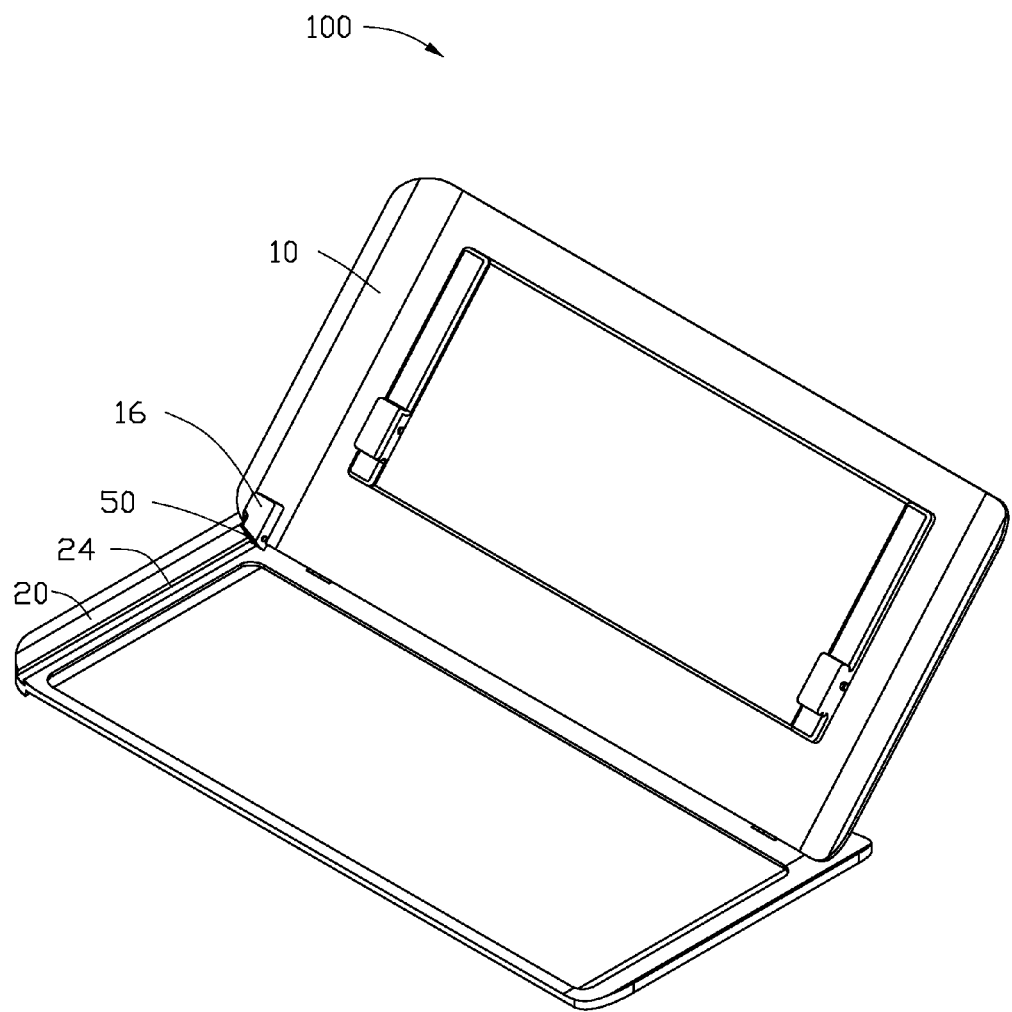
FIG. 5 is an isometric view of the electronic device of FIG. 4 in an open orientation.
Figure 6:
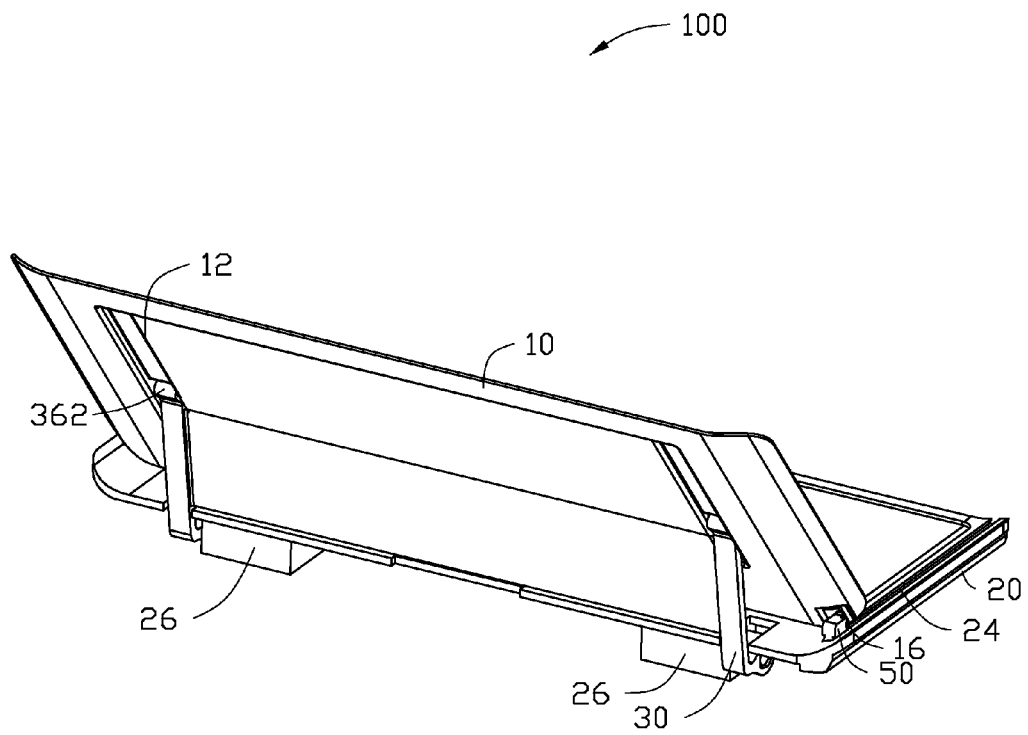
FIG. 6 is similar to FIG. 5, but shown from another angle.

Referring to FIGS. 5 and 6, when the sliding module 100 is to be opened, a force is applied to the first section 10 to move the first section 10 away from the second section 20. The pivot plate 30 is forced to rotate and the sliding member 50 slides in the groove 24 of the second section 20. The pivot plate 30 is not only rotated around the post 15 to support the first section 10, and but also brings the cam 45 to rotate. Thus, the cam 45 is driven to rotate relative to the follower 44. When the cam 45 slides over the peaks of the follower 44, the cam 45 automatically rotates the pivot plate 30 until the first section 10 is completely opened relative to the second section 20. The first section 10 is supported in a tilted position relative to the second section 20.

The sliding module 100 is applied in a portable electronic device such as a mobile phone. The electronic device includes a cover and a housing engageable with the cover. The cover is secured to the first section 10, and the housing is secured to the second section 20. Thus, the portable electronic device opens or closes with the sliding module 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
   a first section including a connecting member;
   a second section;
   a hinge module positioned on the second section;
   a sliding member slidably engaged with the second section, and rotatably connected to the connecting member of the first section; and
   a pivot plate, two ends of the pivot plate respectively connected to the first section and the hinge module;
   wherein when the sliding member slides relative to the second section, the pivot plate brings the first section to move and rotate relative to the second section in a tilted orientation.

2. The sliding module as claimed in claim 1, wherein the first section defines at least one retaining groove, and a post is formed in the at least one retaining groove for rotatably connecting one end of the pivot plate.

3. The sliding module as claimed in claim 2, wherein a bottom portion of the at least one retaining groove is protruded outward to form a cavity and a protruding wall surrounding the cavity, the post is fixed in the cavity, and two ends thereof extend out from the protruding wall.

4. The sliding module as claimed in claim 1, wherein the connecting member is disposed at a corner of the first section, and includes a top wall, a first sidewall and a second sidewall, the first sidewall and the second sidewall are connected at opposite sides of the top wall, thereby surrounding a receiving space for receiving the sliding member.

5. The sliding module as claimed in claim 1, wherein the second section defines a wedge groove, at one end of a surface thereof for slidably receiving the sliding member.

6. The sliding module as claimed in claim 1, wherein a hinge barrel is formed on the second section, a receiving hole is defined at one end of each hinge barrel for receiving the hinge module.

7. The sliding module as claimed in claim 1, wherein the pivot plate includes a main body and two support arms formed at two sides of the main body, each support arm includes a connecting arm, a first hinged portion and a second hinged portion connected to two ends of the connecting arm, the first hinged portion defines a first through hole for connecting to the first section, the second hinged portion defines a second through hole for fixing one portion of the hinge module.

8. The sliding module as claimed in claim 1, wherein the sliding member includes a sliding block and an extending end integrally formed together.

9. The sliding module as claimed in claim 8, wherein the connecting member defines a pivot hole, a pin is formed on the extending end for being received in the pivot hole of the connecting member to allow the sliding member to be rotatably connected to the first section.

10. An electronic device comprising:
    a first section including a connecting member;
    a second section;
    a hinge module positioned on the second section;
    a sliding member slidably engaged with the second section, and rotatably connected to the connecting member of the first section; and
    a pivot plate, two ends of the pivot plate respectively connected to the first section and the hinge module;
    wherein when the sliding member slides relative to the second section, the pivot plate brings the first section to move and rotate relative to the second section in a tilted orientation.

11. The electronic device as claimed in claim 10, wherein a hinge barrel is formed on the second section, a receiving hole is defined at one end of each hinge barrel for receiving the hinge module.

12. The electronic device as claimed in claim 10, wherein the sliding member includes a sliding block and an extending end integrally formed together.

13. The electronic device as claimed in claim 12, wherein the connecting member defines a pivot hole, a pin is formed on the extending end for being received in the pivot hole of the connecting member to allow the sliding member to be rotatably connected to the first section.

14. The electronic device as claimed in claim 10, wherein the second section defines a wedge groove, at one end of a surface thereof for slidably receiving the sliding member.

15. The electronic device as claimed in claim 10, wherein the connecting member is disposed at a corner of the first section, and includes a top wall, a first sidewall and a second sidewall, the first sidewall and the second sidewall are connected at opposite sides of the top wall, thereby surrounding a receiving space for receiving the sliding member.

* * * * *